Dec. 11, 1962 J. B. ORLANDO ETAL 3,067,639
BUTTON COVERING MACHINE
Filed Dec. 12, 1960 4 Sheets-Sheet 1

INVENTORS.
JOHN B. ORLANDO
ANTHONY M. RUGGIERO
MICHAEL COPPOLA
BY
Davis, Hoxie, Faithfull & Hapgood
ATTORNEYS.

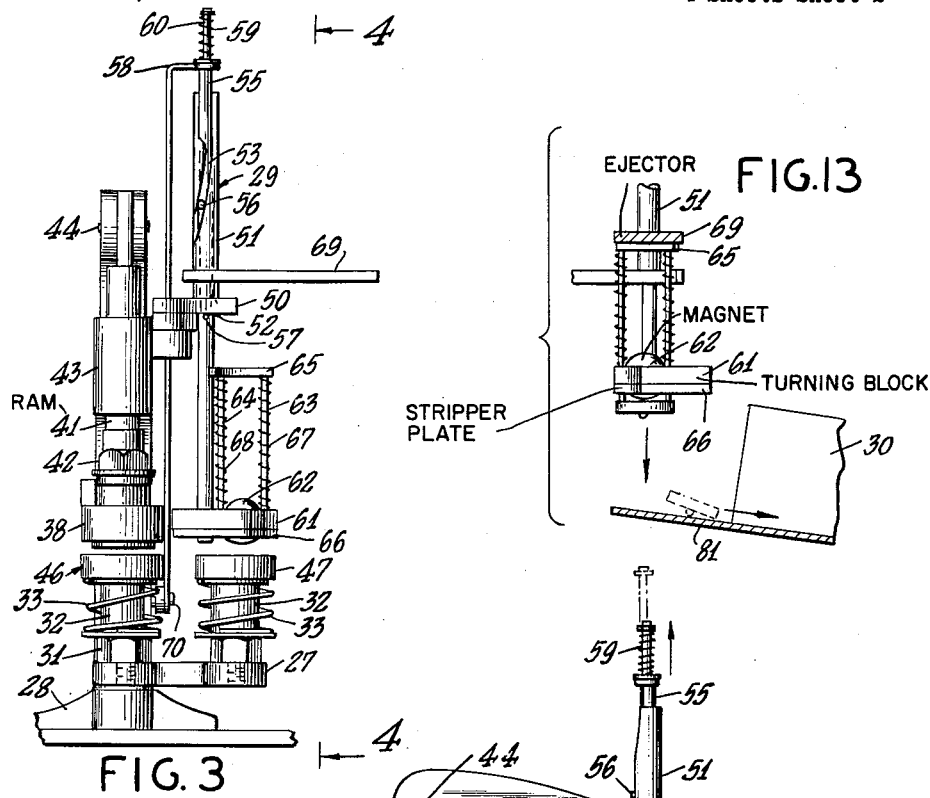
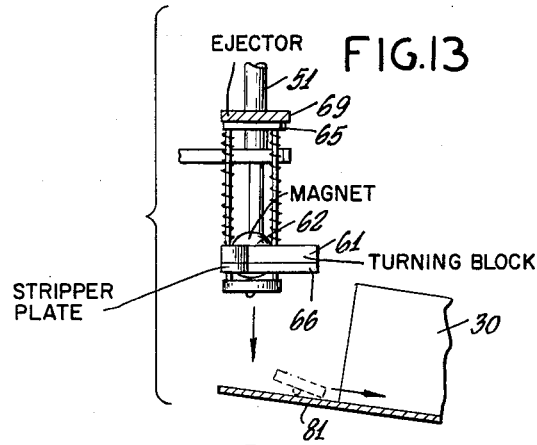
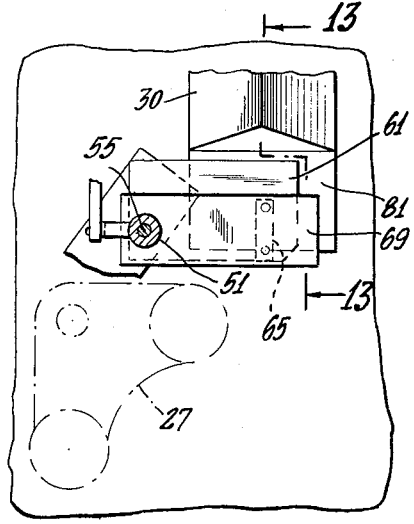
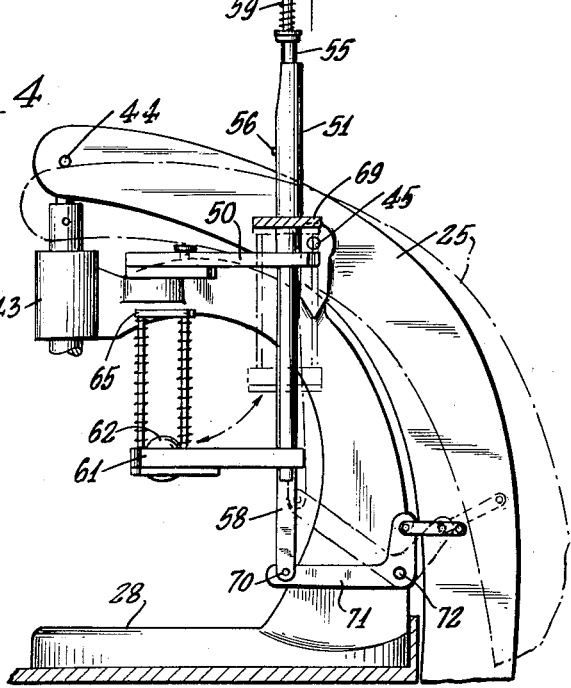

Dec. 11, 1962   J. B. ORLANDO ETAL   3,067,639
BUTTON COVERING MACHINE
Filed Dec. 12, 1960   4 Sheets-Sheet 3

SWIVEL

INVENTORS.
JOHN B. ORLANDO
ANTHONY M. RUGGIERO
BY   MICHAEL COPPOLA

Davis, Hoxie, Faithfull & Hapgood
ATTORNEYS.

Dec. 11, 1962 J. B. ORLANDO ETAL 3,067,639
BUTTON COVERING MACHINE
Filed Dec. 12, 1960 4 Sheets-Sheet 4
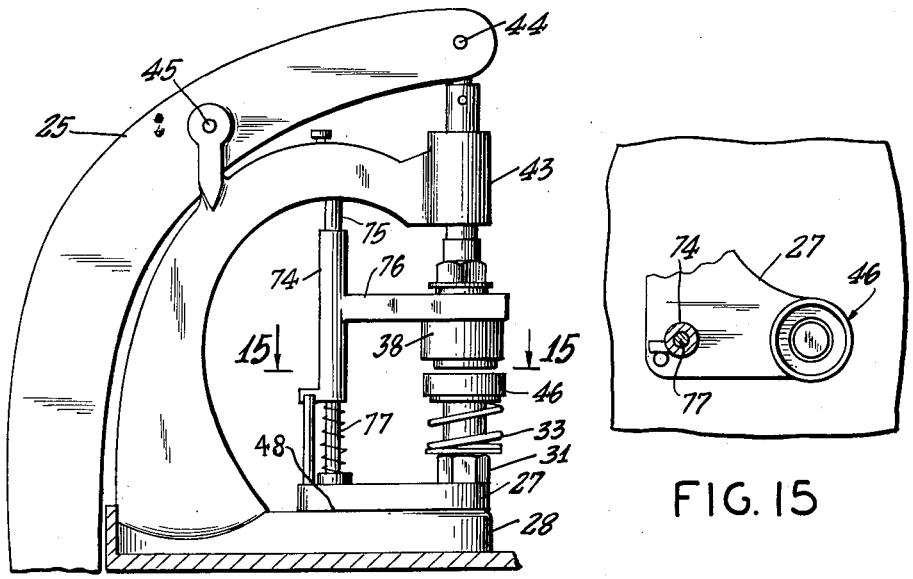
FIG.14
FIG. 15
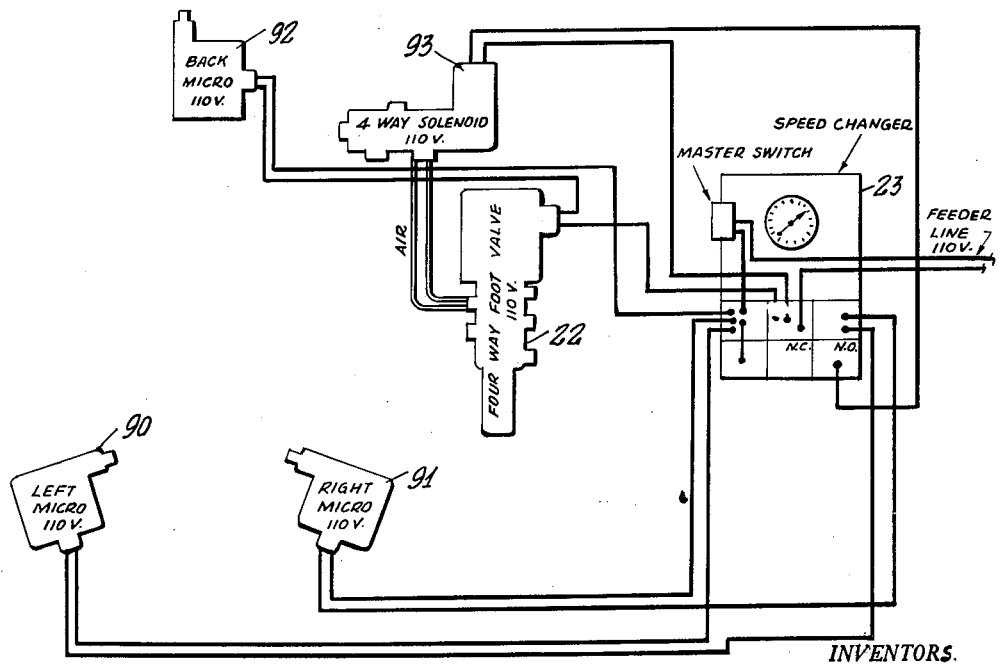
FIG. 16
INVENTORS.
JOHN B. ORLANDO
ANTHONY M. RUGGIERO
BY MICHAEL COPPOLA
Davis, Hoxie, Faithfull & Hapgood
ATTORNEYS.

United States Patent Office 3,067,639
Patented Dec. 11, 1962

3,067,639
BUTTON COVERING MACHINE
John B. Orlando, New York, Anthony M. Ruggiero, Brooklyn, and Michael Coppola, Woodside, N.Y., assignors to Defiance Button Machine Company, New York, N.Y.
Filed Dec. 12, 1960, Ser. No. 94,954
10 Claims. (Cl. 79—5)

The present invention relates to a button-making machine and more particularly to a machine for the manufacture of cloth-covered metallic buttons.

Cloth-covered buttons are widely used for clothing and upholstery. Prior to the present invention it was necessary for an operator to perform a number of manual steps in connection with the manufacture of such buttons. Such steps made for a slow rate of manufacture, high cost, and the danger of injury to the operator from the button-making machine.

It is an objective of the present invention to provide an automatic button-making machine for the production of cloth-covered metallic buttons in which the operators' only function is to feed parts to the machine. It is a further objective that the machine be adjustable for different sizes of buttons and for different speeds of operation. It is a further objective that the machine have a high rate of production and be simple to maintain.

In accordance with the present invention, a swivel having at least two dies swings in timed sequence beneath a vertically-moving ram. The swinging of the dies enables the operator to insert the button parts in the dies. The device is operated by a cylinder which is electrically controlled. An ejecting mechanism automatically strips the button from the die upon its completion.

This invention will be more readily understood from the preferred embodiment illustrated in the enclosed drawings in which:

FIG. 3 is a front plan elevation of the upper portion of the machine;

FIG. 4 is a sectional view taken along lines 4—4 of FIG. 3 showing a side view of the machine;

FIG. 12 is a top plan view of the button stripper;

FIG. 13 is a sectional view taken along lines 13—13 of FIG. 12 showing a side view of the button ejection mechanism;

FIG. 14 is a sectional view taken along lines 14—14 of FIG. 2 showing a side view of the top portion of the machine;

FIG. 15 is a sectional view taken along lines 15—15 of FIG. 14; and

FIG. 16 is a wiring diagram showing the components required for the automatic action of the machine.

Figure 1:
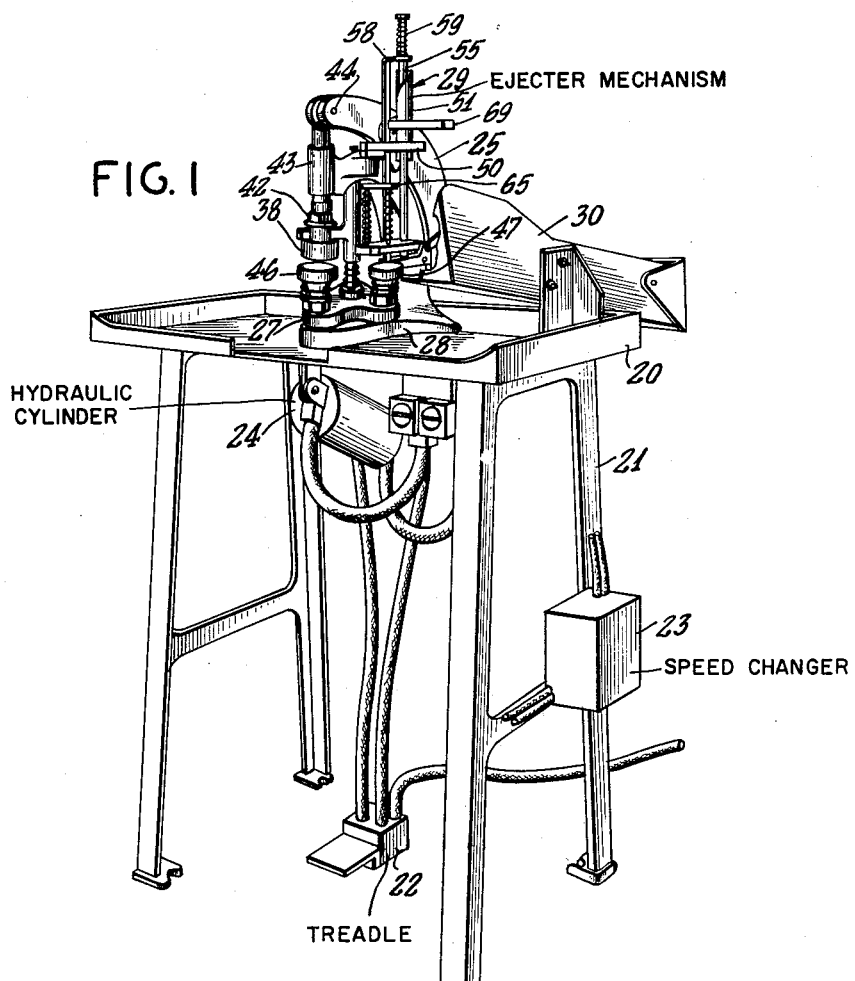
FIG. 1 is a perspective view of the machine of the present invention.
Figure 2:
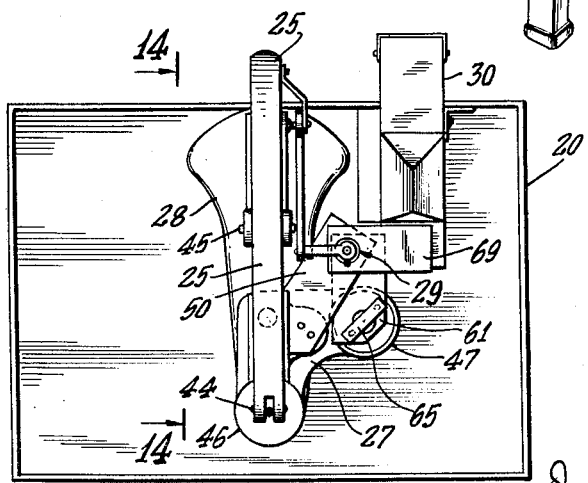
FIG. 2 is a top plan view of the machine.
Figure 5:
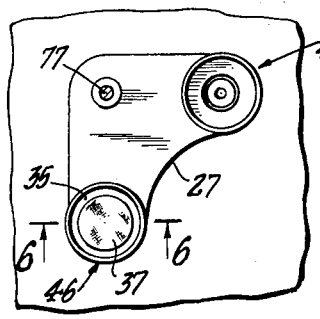
FIG. 5 is a top plan view of the lower dies on the swivel with a button shell and cloth shown in the left die.

In FIG. 1, the machine is shown as mounted on table 20 which rests upon legs 21. The legs are of the proper height to provide comfort to the operator. The operator must be able to selectively depress foot pedal 22 and also feed the button parts at the top portion of the machine.

The speed of the machine is determined by speed changer 23 which is mounted on the side of a leg 21. The other basic portions of the machine are the hydraulic cylinder 24, arm 25, upper die 38, swivel member 27 and its dies, base 28, ejector mechanism 29, and button chute 30.

The steps necessary to manufacture a cloth-covered button are most clearly illustrated by FIGS. 6, 6a, 8, and 10.

Figures 6, 6A:
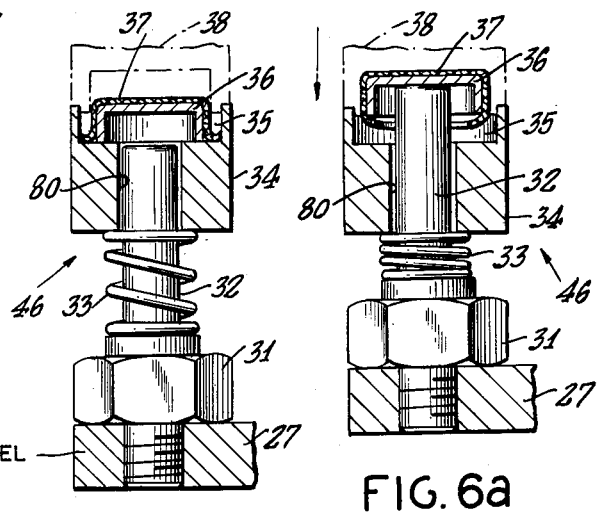
FIG. 6 is a section view of the left die taken along lines 6—6 of FIG. 5 with the upper die shown in dotted outline.
FIG. 6a is the same view as FIG. 6 except that the upper die has descended forcing the plunger upward.
Figure 7:
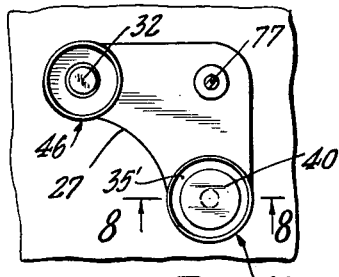
FIG. 7 shows the same portion as FIG. 5 except that the swivel member has been swung to the left and a button back has been inserted in the right die.
Figure 9:
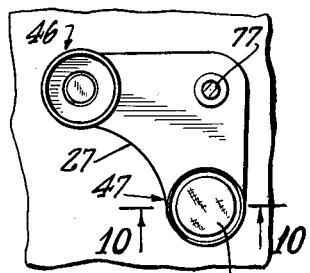
FIG. 9 shows the swivel member with a completed buton in the right die.

FIG. 6 shows the left lower die assembly 46 which rests upon swivel 27 and comprises hold-down nut 31, plunger 32, spring 33, hole 80, and die body 34. Cavity 35 within die body 34 is of the proper size and shape to receive the button shell 36. The shell is a small cup-like member made of thin steel.

In making a button, an operator first inserts shell 36 within cavity 35 and then places a circular piece of cloth 37 over cavity 35.

Figure 10:
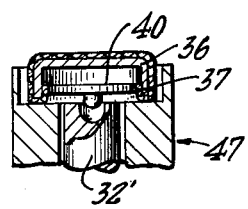
FIG. 10 is a sectional view taken along lines 10—10 of FIG. 9 showing the completed button in the right die.
Figure 8:
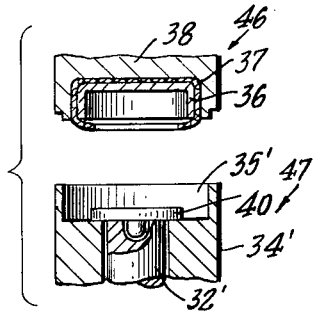
FIG. 8 is a section taken along lines 8—8 of FIG. 7 showing the shell and cloth held in the top die and the button back positioned in the lower die.
Figure 11:
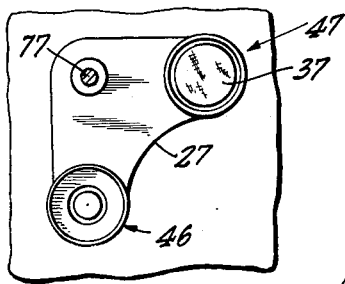
FIG. 11 shows the swivel member with a completed buton in the right die and the swivel swung to the right preparatory to removal of the button.

In FIG. 6a, the shell 36 and the cloth 37 have been lifted upwardly out of cavity 35 by the descent of upper die 38 which lowers die body 34 permitting plunger 32 to come up through hole 80. The descent of die 38 compresses spring 33. The cavity within upper die 38 is proportioned to receive and hold shell 36 and cloth 37 when they are inserted into the cavity by the upward movement of plunger 32. As seen in FIG. 8, shell 36 and cloth 37 are held in the upper die cavity by the frictional contact of the shell and cloth within the cavity of die 38. A button back 40 has been inserted within cavity 35' of die body 34' of right die 47. The upper and lower dies are then brought together a second time so as to form the button (FIG. 10). In the completed button the cloth 37 completely covers the top portion of the button. Shell 36 is hidden from sight and functions to compress the inner portion of the cloth against the button back 40.

Upper die 38 is moved vertically by ram 41 and is attached to the ram by nut 42 (FIGS. 3 and 4). Ram 41 slides within circular member 43 which is fixedly attached to the base 28. At the top of ram 41 is pivot 44 attaching the ram to arm 25. Arm 25 pivots about pivot point 45 and is attached at its lower portion to the piston of cylinder 24. When arm 25 pivots about point 45 the ram 41 is caused to move vertically.

The swivel assembly consists of a swivel base 27 and two lower dies, left die 46 and right die 47. The construction of each of these dies is the same (see FIG. 6). Swivel base 27 pivots about pivot point 48. Such swiveling action takes place by a hydraulic cylinder (not shown) which is controlled through the foot pedal and also automatically by the speed changer. Mounted above pivot point 48 is rocker arm member 74 (FIG. 14). Rocker arm member 74 and its protruding rocker arm 76 swings about rocker arm rod 75 and moves vertically on that rod. It is normally forced upwardly by spring 77. This arm at the appropriate time functions to hold upper die 38 in open position, with die 38 having a cavity, when lower die 46 is positioned underneath. Rocker arm 76 is moved away as lower die 47 is shifted to the left under upper die 38. This permits upper die 38 to close and eject the cloth and shell into lower die 47 when ram 41 is lowered completing the button covering cycle.

Preferably mounted so as to contact extreme swings of the swivel under the table top are left and right microswitches 90 and 91 (FIG. 16). These are electrically connected to the speed changer 23. A back microswitch 92 is positioned so as to contact the arm 25 on its downward stroke. The back microswitch 92 is also connected to the foot pedal 22 which is preferably a four-way foot valve which operates a compressed air line. The air line is also controlled by a four-way electric solenoid 93 which is electrically connected to the speed changer 23. Air pressure of about eighty pounds is satisfactory.

The cycle consists of the operator depressing the foot pedal 22 to swing swivel 27 from left to right. After a predetermined automatically controlled period of time, the solenoid 93, under the control of speed changer 23, causes the swivel to swing from the right to left. In the next step, the operator again depresses foot pedal 22 to swing the swivel from the left to the right. The swivel is again returned automatically to complete the cycle. By means of adjusting speed changer 23 the cycle may take in each of the swings of the swivel from a minimum of one-half second to a maximum of six seconds.

The button-ejecting mechanism 29 is shown in FIGS. 3, 12, and 13. Bracket 50 is fixedly attached to circular member 43. Rod holder 51 slides vertically within hole 52 in bracket 50. It is hollow and has a grooved screw thread-like slot 53. Rod 55 moves vertically within rod holder 51 and also pivots circumferentially with its vertical movement as its pins 56 and 57 slide within the groove 53. Rod 55 is attached at its top to pull rod arm 58. Rod 55 is maintained in a downward position by spring 59 which is coiled about inner rod 60. At its bottom portion rod 55 is fixedly attached to turning block 61. Within turning block 61 is a magnet 62 which protrudes through the block. Rods 63 and 64 which slide through holes in block 61 are held together by top member 65. Rods 63 and 64 are connected at their bottom to stripper plate 66. They are urged upwardly by springs 67 and 68.

The stripper plate has two holes through it which enable the magnet 62 to protrude through the stripper plate when the stripper plate is positioned close against turning block 61. The ends of the magnet which protrude through the stripper plate 66 are to remove the metallic button from the die 47. Near the top of the ejection mechanism is ejector block 69 which is fixed to the frame. Ejector block 69 has a curved front face which hits top member 65 when the turning block 61 is lifted and rotated. The bottom of pull rod arm 58 is connected at pivot point 70 to linking member 71. Linking member 71 pivots at point 72 and is connected at its upper portion to arm 25 (FIG. 4).

In operation die 46 is positioned at the left of ram 41. A shell is manually placed within cavity 35 of the lower left die 46. A circular disc of material, if the button is round, is manually positioned over the top of cavity 35. The operator then depresses foot pedal 22 causing the swivel 27 to pivot towards the right. The pivoting brings lower die 46 directly beneath the upper die 38. The piston of cylinder 24 is extended automatically by the swivel actuating a microswitch. As the piston is connected to the bottom portion of arm 25 the arm pivots about pivot point 45 causing ram 41 to descend. The upper die 38 is forcibly lowered upon lower die 46, causing die body 34 to slip down over plunger 32. The plunger 32 positions shell 36 and cloth 37 within the cavity of upper die 38.

During the time that the upper die 38 is descending to contact lower die 46, the operator has placed a button back 40 within the cavity of lower right die 47. As this lower right die is not underneath the ram simultaneously with the lower left die, it is free for such insertion. Automatically, by the speed changer, the ram 41 is raised through the operation of arm 25. Simultaneously swivel 27 swings to the left, positioning right lower die 47 underneath the upper die 38. Automatically, through the speed changer, the cylinder 24 is again activated, causing arm 25 to pivot and upper die 38 to descend. The descent of upper die 38 pushes die body 34' of right lower die 47 downwardly, which, as the plunger 32' is fixed, causes the button back 40 to be inserted within shell 36. The insertion of the back carries with it a flap portion of the cloth 37. The insertion is with a ram force of about 80 pounds so as to firmly adhere the cloth flap between the back 40 and the shell 36.

In automatic timed sequence the upper die is returned to the upper position and swivel 27 again swings to the right. The button is then loosely resting within the lower right-hand die 47, the compression of the button body into the shell having caused the button to drop out of the cavity within the upper die. When the completed button is swung to the right, a small magnet 62 picks the button up from out of the cavity in die 47. The magnet retains the button until the arm 25 again descends in the process of making the next button in the series. Upon the operation of arm 25, pull rod arm 58 is raised due to the pivoting of linking member 71. The raising of arm 58 causes turn rod 55 to ascend and to pivot. The pivoting of turn rod 55 causes turning block 61 to turn bringing top member 65 into striking contact with ejector block 69. The curved face of ejector block 69 causes top member 65 to descend, thereby lowering rods 63 and 64. The rods pass through holes in the turning block 61 forcing the stripper plate 66 down (see FIG. 13). This descent of stripper plate 66 removes the completed button from the projecting magnet 62. The button falls to the base plate 81 of the button chute 30, and falls out through sheet metal chute 30 by force of gravity (FIG. 13).

Modifications may be made in this invention within the scope of the subjoined claims.

What is claimed is:

1. A machine for the manufacture of a button having a back member and a covering comprising a base, a swivel pivoted on the base, two dies attached to the swivel, a ram positioned above the swivel, and an upper die attached to the ram, characterized in that it also comprises a cylinder having a piston mechanically linked to the ram and a limit switch controlling the operation of the piston positioned so as to be activated by the swivel.

2. A button machine as in claim 1 wherein the piston is attached to the ram through a pivotable arm.

3. A button machine as in claim 1 wherein the dies attached to the swivel include a fixed plunger and a spring-loaded die body haing a hole through which the plunger moves.

4. A button machine as in claim 1 wherein the cylinder is initially operated in its cycle of operation by a manually-operated switch.

5. A button machine as in claim 1 having an automatic ejector mechanism for the completed button positioned so as to remove the completed button from one of the dies attached to the swivel.

6. An ejector mechanism for button machines comprising means to remove the button from a button holder, a turning block having a hole therethrough upon which the button is held after removal from the holder, a first rod which moves within the hole in the turning block, a second rod which is fixed to the turning block, means to move the second rod so as to move the turning block, a fixed ejector block so arranged that movement of the turning block causes the first rod to strike the ejector block whereby the first rod moves through the hole in the turning block to force the held button off the turning block.

7. An ejector mechanism as claimed in claim 6 wherein the removal means is a magnet.

8. An ejector mechanism as claimed in claim 6 wherein the moving mechanism for the second rod comprises a mechanical linkage from the second rod to a moving member of the button machine.

9. An ejector mechanism as claimed in claim 6 wherein the second rod moves vertically by means of the linkage to the button machine member and pivots by means of lugs attached to it, which lugs slide within a screw thread-like caity in a fixed member.

10. A machine for the manufacture of a button having a back member and a covering comprising a base, a swivel pivoted on the base, two dies attached to the swivel, a ram positioned above the swivel, an upper die attached to the ram, means for vertically moving the ram, an automatic switch controlling the said means, and an ejector mechanism comprising means to remove the button from a die, a turning block having means to hold the button after removal from the holder, means to move the turning block, means to strip the button from the holding means, and a fixed ejector block so arranged that movement of the turning block causes the stripping means to force the held button off of the holding block.

References Cited in the file of this patent
UNITED STATES PATENTS

| | | |
|---|---|---|
| 899,098 | Breitenstein | Sept. 22, 1908 |
| 918,117 | Lundquist | Apr. 13, 1909 |
| 1,233,266 | Eggersqluess | July 10, 1917 |
| 2,324,009 | McDonough | July 13, 1943 |
| 2,591,203 | Schmalz | Apr. 1, 1952 |

UNITED STATES PATENT OFFICE
CERTIFICATE OF CORRECTION

Patent No. 3,067,639 December 11, 1962

John B. Orlando et al.

It is hereby certified that error appears in the above numbered patent requiring correction and that the said Letters Patent should read as corrected below.

Column 1, lines 59 and 63, for "buton", each occurrence, read -- button --; column 5, line 7, for "caity" read -- cavity --.

Signed and sealed this 16th day of July 1963.

(SEAL)
Attest:

ERNEST W. SWIDER
Attesting Officer

DAVID L. LADD
Commissioner of Patents